(12) United States Patent
Yang et al.

(10) Patent No.: US 8,660,578 B1
(45) Date of Patent: Feb. 25, 2014

(54) PROXIMITY HUMAN MOTION DETECTION USING WIRELESS SIGNALS

(75) Inventors: Lei Yang, Hillsboro, OR (US); Xue Yang, Arcadia, CA (US); Tzahi Weisman, Mevaseret Zion (IL); Anthony G. Lamarca, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/606,335

(22) Filed: Sep. 7, 2012

(51) Int. Cl.
*H04W 24/00* (2009.01)

(52) U.S. Cl.
USPC ............................ 455/456.1; 455/456.3

(58) Field of Classification Search
USPC ............................ 455/456.1–456.6, 418–420
See application file for complete search history.

(56) References Cited

U.S. PATENT DOCUMENTS

| | | | |
|---|---|---|---|
| 5,983,104 A | 11/1999 | Wickman et al. | |
| 6,683,568 B1 | 1/2004 | James et al. | |
| 2003/0060164 A1 | 3/2003 | Bonhomme | |
| 2005/0014511 A1* | 1/2005 | Spain | 455/456.1 |
| 2005/0221829 A1 | 10/2005 | Nishida et al. | |
| 2006/0046745 A1* | 3/2006 | Davidson | 455/456.4 |
| 2010/0285815 A1* | 11/2010 | Treu et al. | 455/456.1 |
| 2010/0309051 A1 | 12/2010 | Moshfeghi | |

FOREIGN PATENT DOCUMENTS

GB 2466049 A * 6/2010 ............ G01S 11/06

OTHER PUBLICATIONS

International Search Report and written opinion, PCT/ISA/210, PCT/ISA/220, PCT/ISA/237, Sep. 27, 2013, total of 9 pages.

* cited by examiner

*Primary Examiner* — Brandon Miller
(74) *Attorney, Agent, or Firm* — Pillsbury Winthrop Shaw Pittman LLP

(57) ABSTRACT

A device, system, and method are presented for detecting motion. The system may include the device and a first transmitter and a second transmitter configured to transmit a first set of wireless signals and a second set of wireless signals, respectively. The device may have a receiver configured to receive the first and second set of wireless signals, and may further include a processing unit that determines a first value and a second value indicative of fading attenuations experienced by the first set of wireless signals and the second set of wireless signals, respectively. The processing unit may further determine whether the first and second values are each consistent with motion of an object in proximity to the device. The processing unit may cause the device to output an indication of presence of the object if both values are consistent with motion of the object in proximity to the device.

24 Claims, 12 Drawing Sheets

PROXIMITY HUMAN MOTION DETECTION USING WIRELESS SIGNALS

TECHNICAL FIELD

This disclosure relates generally to motion detection, and more particularly to the detection of motion by wireless-enabled devices.

BACKGROUND ART

Current trends appear to indicate that the motion of wireless-enabled devices may provide some insight into a user's state. That is, the motion of a wireless-enabled device may indicate some information regarding where the wireless-enabled device is, how it is being used, or other context-based information. Such information may then be applied to a variety of applications, such as social networking, asset tracking, assisted living services, etc.

Conventional motion detection techniques rely on established technologies, such as global positioning systems (GPS), accelerometers, or cameras. GPS technology or an accelerometer may be used to detect motion of only the device itself, while a camera may be used to detect motion of a user or other object within the camera's line of sight. These techniques, however, have their limitations. For example, a device that relies on GPS tracking or a camera for motion detection may raise privacy concerns while a device that incorporates accelerometer-type devices may raise manufacturing costs and introduce hardware complexities. Although some devices have begun to use received signal strength indication (RSSI) to detect a change in a wireless-enabled device's location relative to a signal transmitter, large variations in RSSI may make such detection unreliable.

SUMMARY OF THE INVENTION

In accordance with various embodiments of this disclosure, a system, device, and method for detecting motion is presented. The system may include the device and a first transmitter and a second transmitter. The first transmitter may be configured to transmit a first set of wireless signals, and the second transmitter may be configured to transmit a second set of wireless signals. The device may have a receiver configured to receive the first and second set of wireless signals, and may further include a processing unit. The processing unit may determine a first value indicative of fading attenuations experienced by the first set of signals and determine a second value indicative of fading attenuations experienced by the second set of wireless signals. The processing unit may further determine whether the first value is consistent with motion of an object in proximity to the device and whether the second value is consistent with motion of the object in proximity to the device. The processing unit may cause the device to output an indication of presence of the object if both values are consistent with motion of the object in proximity to the device.

In accordance with various embodiments of this disclosure, processing unit may determine the first value by determining, for each wireless signal of the first set of wireless signals, a fading profile indicative of how the wireless signal experiences fading attenuation at the device. The processing unit may then determine the first value based on one or more differences among the determined fading profiles of the first set of wireless signals.

In accordance with various embodiments of this disclosure, the processing unit may be configured to determine a difference in shape between at least two of the determined fading profiles. In accordance with various embodiments of this disclosure, the processing unit may be configured to determine a variance or standard deviation among the determined fading profiles.

In accordance with various embodiments of this disclosure, each wireless signal may be a wireless packet. The processing unit may be configured to determine the fading profile of one of the first set or second set of wireless packets by determining a channel fading profile indicative of how the wireless packet undergoes frequency-selective fading at the device.

In accordance with various embodiments of this disclosure, the processing unit is configured to train a classifier function that relates values corresponding to differences among fading profiles with movement of one or more objects in proximity to the device. Determining whether the first value or the second value is consistent with motion of the object may be based on the classifier function.

In accordance with various embodiments of this disclosure, the processing unit may be configured to normalize a fading profile of a wireless signal. The processing unit may, for example, normalize the fading profile by dividing the fading profile by an average value of the fading profile.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

DETAILED DESCRIPTION

Figure 1:
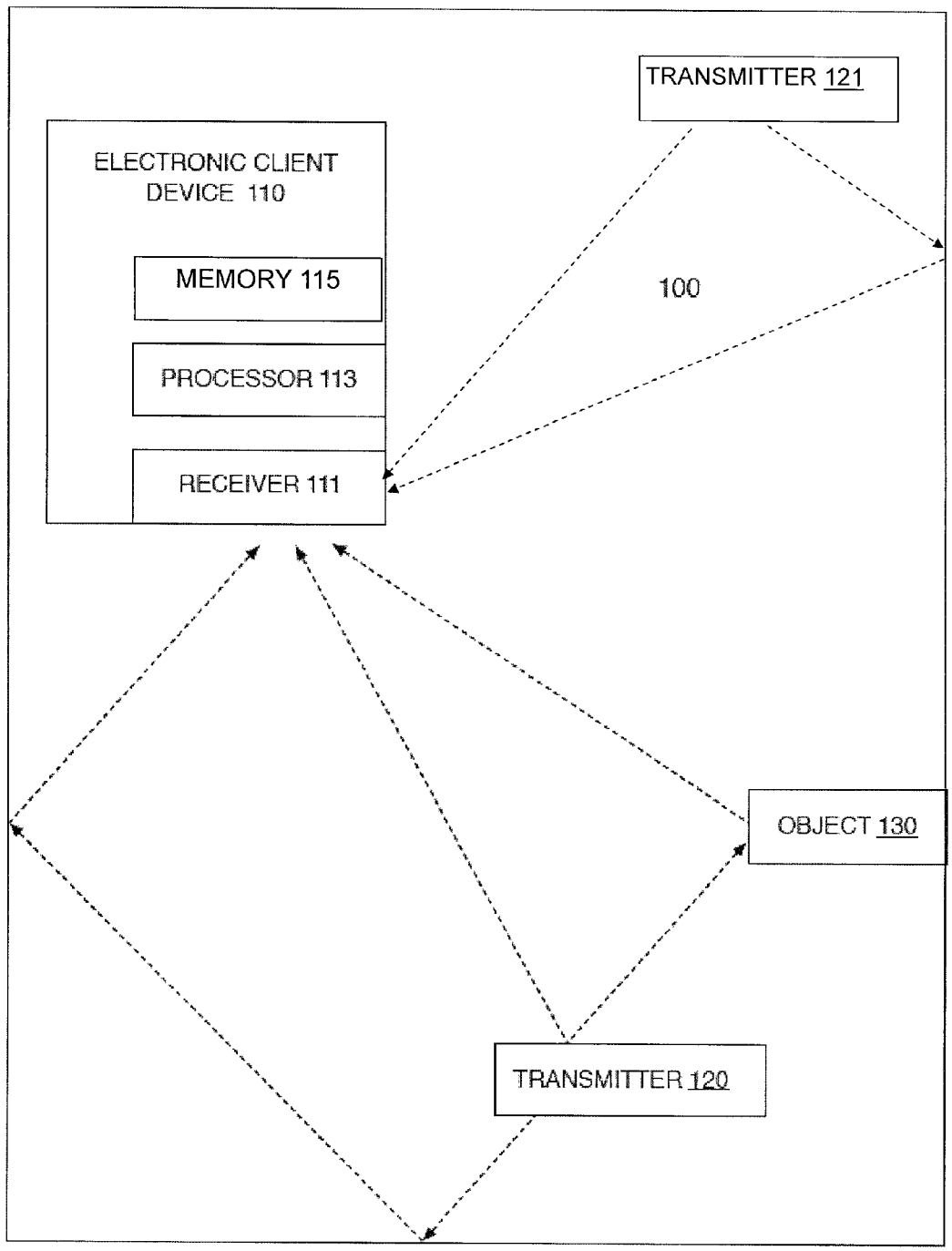
FIG. 1 depicts an example system for detecting motion based on a channel fading profile, in accordance with various aspects and principles of the present disclosure.

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

Turning now to the various aspects of the disclosure, FIG. 1 depicts a non-limiting example of a system, such as system 100, for detecting motion based on channel characteristics of wireless signals (e.g., of wirelessly-enabled signals). System 100 may be configured to detect when a wireless-enabled device, is moving. Alternatively, or in addition to, system 100 may also be configured to detect when the wireless-enabled device is stationary and an object, such as a person, is moving within the vicinity of the wireless-enabled device.

Detecting motion of the wireless-enabled device may provide information indicative of where the wireless-enabled device is, how it is being used, or other context-based information. For example, movement of the wireless-enabled device may be used to track the activity level of a patient in an assisted-living center. In another example, the wireless-enabled device may be a receiver chip embedded in shipping containers, and movement of the wireless-enabled device may be used to track the shipping containers. In another example, movement of the wireless-enabled device may be used to control how often the wireless-enabled device performs GPS or other location tracking operations. If the wireless-enabled device is determined to not be in motion, the GPS or other location tracking operations may be suspended because the location of the wireless-enabled device is not changing. Suspending such operations may improve the speed and power consumption of the wireless-enabled device.

Moreover, detecting motion of a person or other object in a vicinity of the wireless-enabled device may provide information indicative of whether the person is near the wireless-enabled device. That is, detecting movement of the person may indicate that the person is approaching the wireless-enabled device. Detecting the approach of the person may be used to exit a screensaver mode, unlock or wake up the wireless-enabled device, or otherwise prepare the wireless-enabled device for use by the person. In another example, detecting the approach of the person may be used by a surveillance system to detect that one or more people are present in a monitored environment. In one embodiment, object motion may have to be within sufficient proximity (e.g., 5 m) before its effects on channel characteristics are detectable. In such an embodiment, detection of the fading dynamics may be used for proximity detection. Further, one instance of detecting motion of the person may require the wireless-enabled device to remain stationary. For example, an indication that there is human or other object motion in proximity to the wireless-enabled device may be outputted only if the wireless-enabled device is determined to be not moving. It will be appreciated that an object being proximate to or in proximity to a device may include being within the vicinity of or being close to the device within a certain range given the nature and characteristics of the wireless signal as well as the impact of the object on those signals within that range.

Returning to FIG. 1, detection of motion of a wireless-enabled device, such as wireless-enabled device 110, or of an object, such as object 130, may be based on channel characteristics of wireless signals received by wireless-enabled device 110. The wireless signals may be received from one or more transmitters, such as transmitter 120 and transmitter 121.

The channel characteristics of one of the signals may measure signal fading from interference caused by reflections, delays, and attenuations of that signal. For example, as illustrated in FIG. 1, wireless-enabled device 110 may receive multiple copies of a wireless signal broadcasted from transmitter 120 or transmitter 121 of system 100. The multiple transmitters may, in some cases, transmit signals at different time so as to avoid collision among the multiple signals. A copy of the signal from one of the transmitters may directly reach wireless-enabled device 110 or may take a path that involves one or more reflections, delays, or attenuations.

Along these lines, an indoor environment may particularly offer many different paths by which a signal can reach a receiver. And, the multiple copies of the wireless signal that arrive at wireless-enabled device 110 may interfere with each other. For example, because the copies of a transmitter signal may have each propagated a different distance to reach wireless-enabled device 110, they may be out of phase at wireless-enabled device 110 and may thus destructively interfere with each other. The destructive interference may be detected as fading attenuation at wireless-enabled device 110. Because phase depends on propagation distance and thus depends on location, channel fading is generally sensitive to changes in wireless-enabled device's 110 location and to environmental changes that may alter signal paths. Moreover, because movement of wireless-enabled device 110 changes its location, the movement may be detected through changes in channel fading characteristics of a signal measured by wireless-enabled device 110.

Further, movement of an object, such as a person, in the environment may also be detected. Copies of a wireless signal may reflect off or be absorbed by the person, and movement of the person may shift where the copies of the wireless signal are reflected and may thus alter their signal paths. The altered signal paths may be detected through a change in channel fading characteristics of wireless signals received by wireless-enabled device 110. Signal paths may be altered differently when the moving object is in a vicinity of the device versus when the object is far away. Thus, the change in channel fading characteristics may indicate not only motion of the object, but motion of the object in the vicinity of the device.

As such, wireless-enabled device 110 may be configured to distinguish between movement of the wireless-enabled device and movement of an object in the vicinity of the wireless-enabled device. As discussed in more detail below, how channel fading characteristics change in the former situation may be different than how channel fading characteristics change in the latter situation. Thus, distinguishing between statistical properties of the channel fading characteristics in the two situations may enable wireless-enabled device 110 to distinguish between motion of the wireless-enabled device and motion of the object near the device.

In addition, wireless-enabled device 110 may be configured to distinguish between an object, such as object 130, moving in a vicinity of the wireless-enabled device and the object moving in a vicinity of one of the transmitters. In some instances, both situations may cause similar changes in channel fading characteristics. Thus, when a transmitter is located such that a person or other object may pass near (e.g., within 5 meters or within 1 meter) of the transmitter, the object's motion may cause a false positive detection that mistakenly indicates the object to be moving in a vicinity of the wireless-enabled device.

To distinguish between the two situations, wireless-enabled device 110 may rely on multiple signals from multiple transmitters. For example, device 110 may receive one or more signals from transmitter 120, and later receive one or more signals from transmitter 121. If object 130 is in the vicinity of device 110, it may affect channel fading characteristics of both the one or more signals from transmitter 120 and of the one or more signals from transmitter 121 in a similar way. If, however, object 130 is in the vicinity of only transmitter 120 or only transmitter 121, it may affect channel fading characteristics of the one or more signals from transmitter 120 differently than the channel fading characteristics of the one or more signals from transmitter 121. Thus, analyzing channel fading characteristics of signals from multiple transmitters may reduce false positive identifications of object motion in proximity to the device.

Referring to FIG. 1, wireless-enabled device 110 may comprise, for example, a laptop, mobile device, cellular/smartphone, gaming device, tablet computer, a wireless-enabled patient monitoring device, or any other electronic wireless-enabled device configured to receive a wireless signal. Wireless-enabled device 110 may include processor 113 and memory 115.

Processor 113 or any other processing unit may be part of a core processing or computing unit of wireless-enabled device 110, and is configured to receive and process input data and instructions, such as, determining channel characteristics of the wireless signal, detect motion based on the channel characteristics, or execute both operations, in accordance with embodiments of the present disclosure. In addition, processor may be integrated into a system-on-chip (SoC) platform. Memory 115 of wireless-enabled device 110 may be a dynamic storage device coupled to a bus infrastructure and configured to store information, instructions, and programs, to be executed by processor 113 and/or other processors (or controllers) associated with device 110. Some or all of memory 115 may be implemented as Dual In-line Memory Modules (DIMMs), and may be one or more of the following types of memory: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDECSRAM, PCIOO SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), or any other type of memory device. Wireless-enabled device 110 may also include read only memory (ROM) and/or other static storage devices coupled to the bus infrastructure and configured to store static information and instructions for processor 113 and/or other processors (or controllers) associated with device 110.

In some embodiments, wireless-enabled device 110 may not have a processor. In such embodiments, a received packet may be relayed to a separate device, such as a server, for determining channel characteristic information, such as a fading profile or fading change.

Wireless-enabled device 110 may further include receiver 111 configured to receive a wireless signal. In one embodiment, receiver 111 may be configured to receive a wireless signal that has one or more frequencies in a radio frequency (RF) range. In one non-limiting example, receiver 111 may be responsive to WiFi data packets having frequency content in a 20 MHz or 40 MHz channel based around 2.4 GHz or 5 GHz, or otherwise in accordance with the IEEE 802.11a, b, g, or n standard. In another non-limiting example, receiver 111 may be configured to receive a data packet transmitted based on WiMax or other IEEE 802.16 standard, Wi-Fi, Bluetooth, GSM, CDMA, GPRS, 3G or 4G, LTE, Wireless USB, and/or Wireless LAN standards or any other implementation of a wireless standard. It will be appreciated that wireless signal is not limited to any specific standard and the examples discussed may be implemented separately or in combination with each other.

Moreover, in one embodiment, receiver 111 may include 2, 3, or 4 antennas that each operate as a receiver chain in a MIMO configuration. In some cases, receiver 111 may be an Intel WiFi™ Link 5300 (iwl 5300) wireless network adapter card.

With regard to transmitter 120 or transmitter 121 of system 100, some or all may be configured as a WiFi™ access point (AP), WiMax™ access point, or any other wireless access point. One or both transmitters may include one or more antennas configured to transmit a wireless signal in one or more directions. In one embodiment, each transmitter may be configured to transmit a wireless signal in the form of a wireless packet, such as a beacon packet.

Figure 2A:
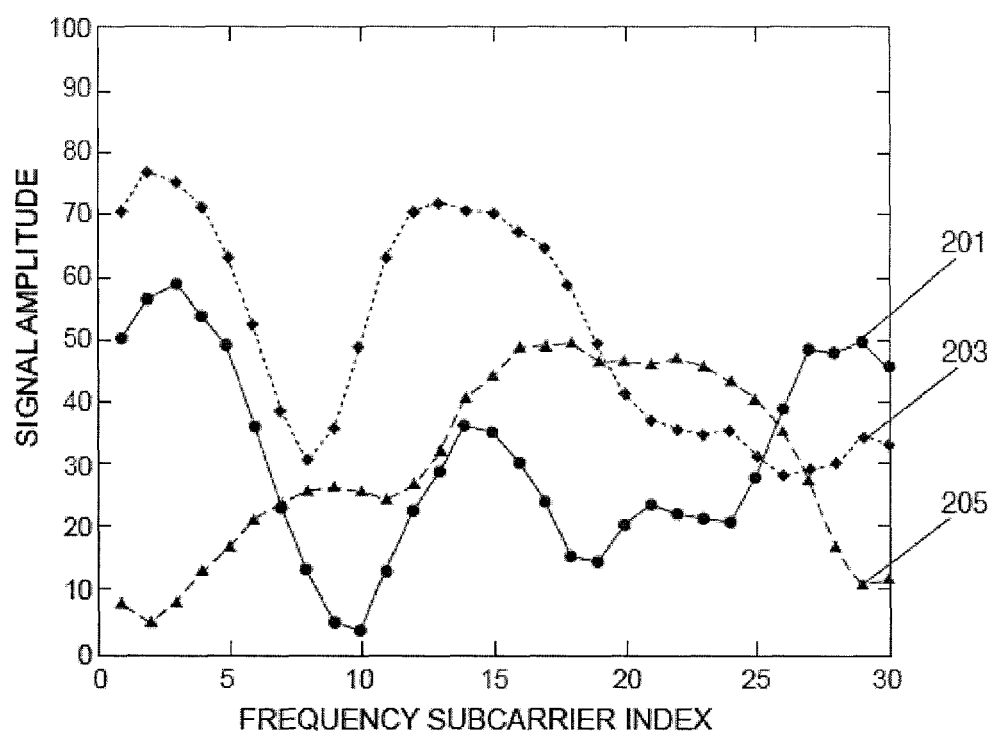
FIGS. 2A-2C depict example channel fading profiles, in accordance with various aspects and principles of the present disclosure.

To detect motion, channel characteristics of one or more wireless signals transmitted by one or more transmitters and received by wireless-enabled device 110 may be analyzed. The channel characteristics of a wireless signal may include the signal's fading profile, which represents how copies of the wireless signal interfere at wireless-enabled device's 110 location. Along these lines, FIG. 2A illustrates fading profiles 201, 203, and 205, that correspond to how a wireless signal fades at three different locations. As discussed above, phase differences that cause fading are location-sensitive. That is, movement introduces fading dynamics, such as changes in fading profiles, measured by a receiver. The fading dynamics result from changes to signal propagation distances and phases as the wireless-enabled device is moved to new locations. Movement of a receiver by several centimeters, for example, may affect the fading. By way of illustration, fading profiles 201, 203, and 205 were measured at three locations spaced 5 cm apart.

Fading profiles 201, 203, and 205 may include a set of channel response values that correspond to multiple frequencies. A fading profile may thus capture the fading behavior over a range of frequencies. In one example, the range of frequencies may correspond to subchannels (e.g., subcarrier frequencies) at which receiver 111 is responsive. For a WiFi™ receiver, for example, the fading profile may be calculated to determine channel response values over a range of subchannels (e.g., 30, 64, or 128 subchannels) in a 2.4 GHz band. The channel response values may be scalar values that indicate signal amplitude or may be complex values that also include phase information. The fading profile may be generated by a discrete Fourier transform of a data packet, by channel estimation on different subchannels from preamble synchronization, or by any other technique.

Figure 2B:
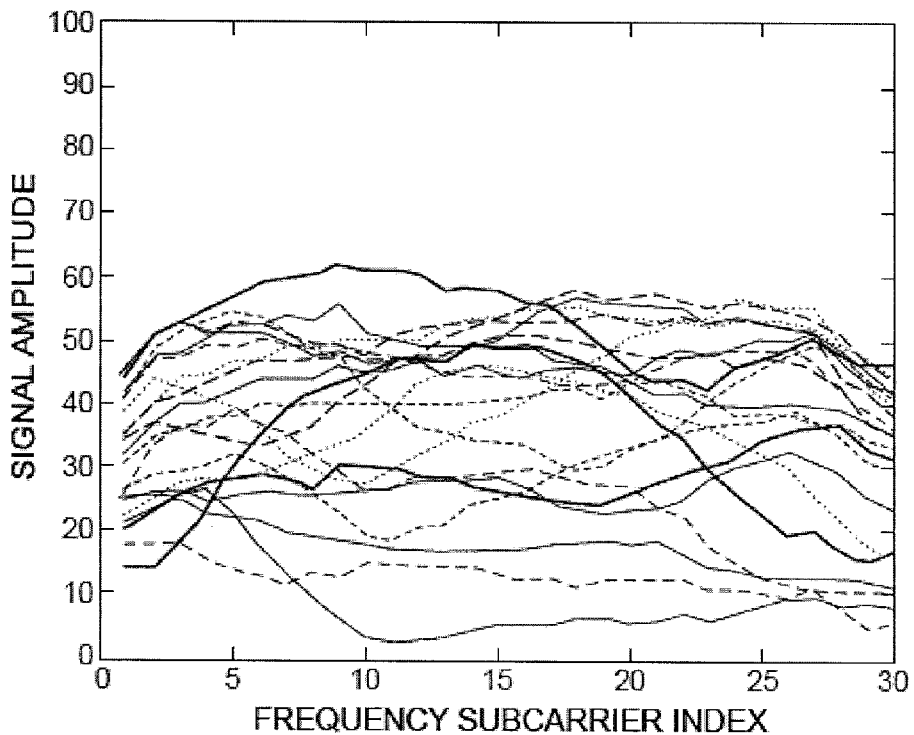
Figure 2C:
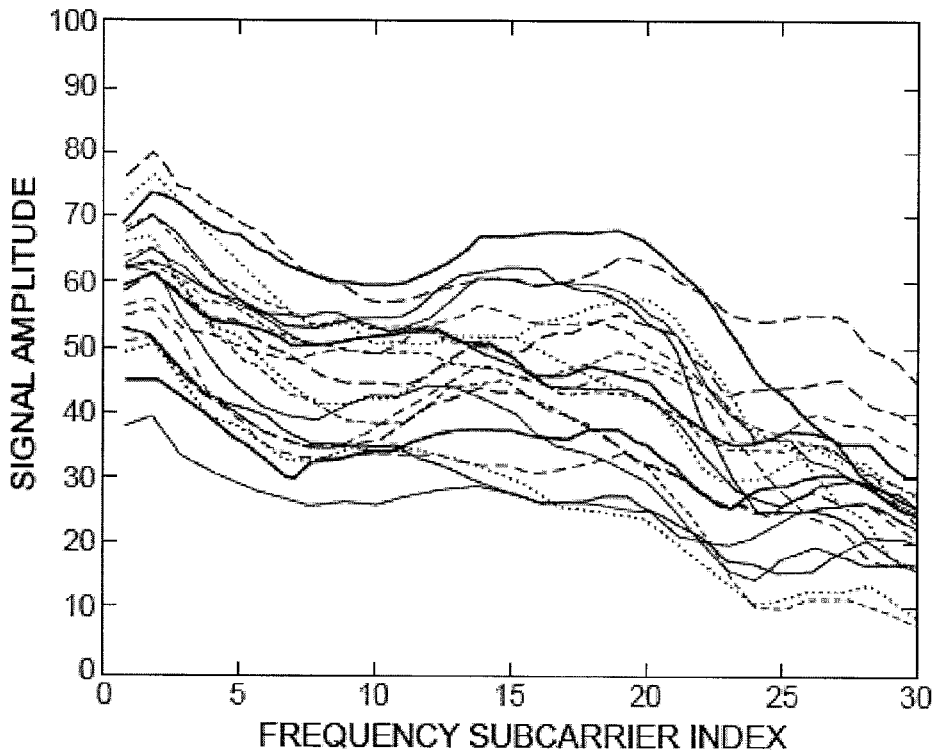

As discussed above, wireless-enabled device 110 may be configured to distinguish between movement of the wireless-enabled device and movement of an object in the vicinity of the wireless-enabled device. FIG. 2B illustrates example fading profiles measured by wireless-enabled device 110 when the wireless-enabled device is moving, and FIG. 2C illustrates example fading profiles measured by wireless-enabled device 110 when the wireless-enabled device is stationary and an object in the vicinity of wireless-enabled device 110 is moving. FIG. 2B illustrates that when wireless-enabled device 110 moves to various locations, fading profiles measured by the wireless-enabled device appear to change much more randomly than when wireless-enabled device 110 is stationary, while FIG. 2C illustrates that when wireless-enabled device 110 is stationary and an object in the vicinity of wireless-enabled device 110 is moving, the fading profiles change, but still appear to show a similar trend.

The similar trend exists because, although movement of the object may alter some signal paths by changing where they reflect off the object, the moving object affects only a subset of the paths that a wireless signal may take to reach the location of wireless-enabled device 110. Many copies of the wireless signal may reach the wireless-enabled device 110 without being affected by the object. Thus, the moving object may still introduce fading dynamics, which may resemble Gaussian noise that varies the measured fading profile as the object moves, but the varied fading profiles may still all show similar frequency-dependent patterns. As such, analyzing fading profiles and statistical properties of the fading profiles may indicate whether detected motion is consistent with device motion or consistent with object motion.

Figure 3:
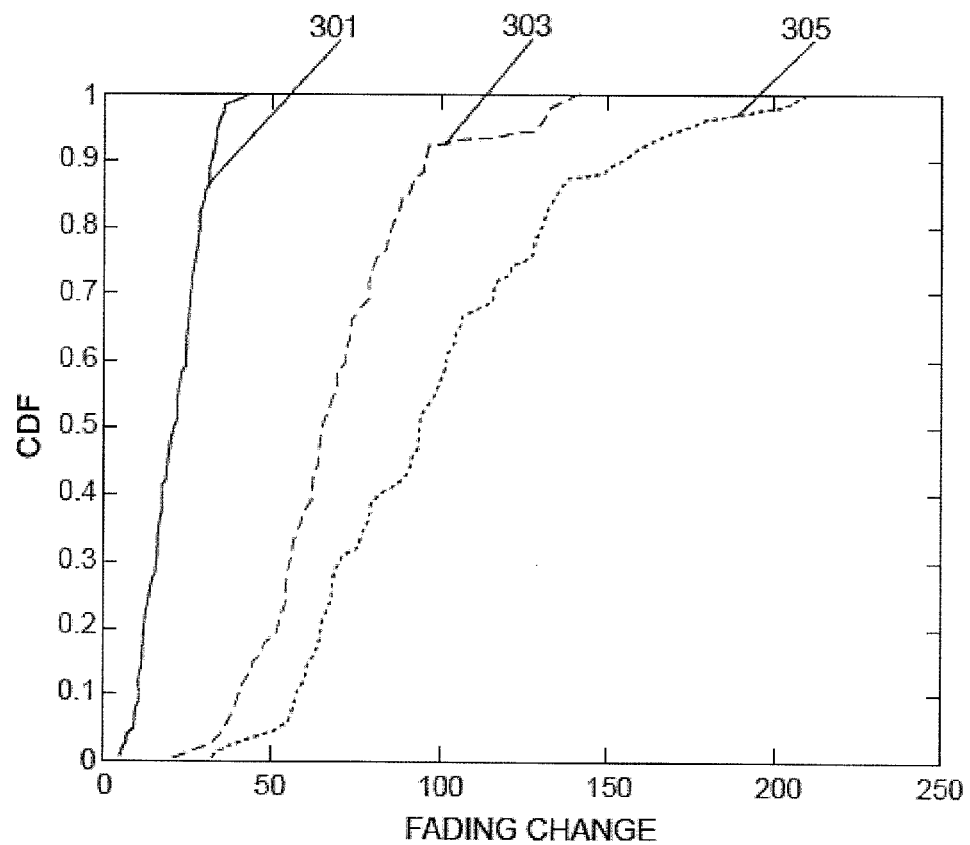
FIG. 3 illustrates example cumulative distribution functions of fading changes in static, device motion, and object motion situations, in accordance with various aspects and principles of the present disclosure.

FIG. 3 further illustrates that motion of the wireless-enabled device and motion of the object may show statistically different properties. The figure shows example plots of cumulative distribution functions (CDF's) of fading change in a situation in which there is no motion, in a situation in which wireless-enabled device 110 is moving, and in a situation in which wireless-enabled device 110 is stationary and an object in the vicinity of wireless-enabled device 110 is moving. Fading change between two fading profiles may be calculated as, for example, the Euclidean distance between the two fading profiles. Plots 301, 303, and 305 show a CDF of fading change corresponding to the no motion, object motion, and device motion situations, respectively. As illustrated in FIG. 3, fading change measured by a moving wireless-enabled device 110, as evidenced by plot 305, will likely be greater than fading change measured by a stationary wireless-enabled device 110, as evidenced by plots 301 and 303. Further, fading change measured by the stationary wireless-enabled device 110 if an object in the vicinity is moving, as seen by plot 303, will likely be greater than fading change experienced by the stationary wireless-enabled device if no object in the vicinity is moving, as shown by plot 301.

However, as discussed above, object motion in the vicinity of a transmitter may affect channel fading characteristics in a way that resembles effects of object motion in the vicinity of the wireless-enabled device. For example, when object 130 moves near transmitter 120, channel fading profiles of signals from transmitter 120 may resemble the fading profiles shown in FIG. 2C. As discussed in more detail below, the channel fading profiles of signals from multiple transmitters may be used to resolve whether the object is moving near wireless-enabled device 110 or is moving near one of the transmitters.

Figure 4A:
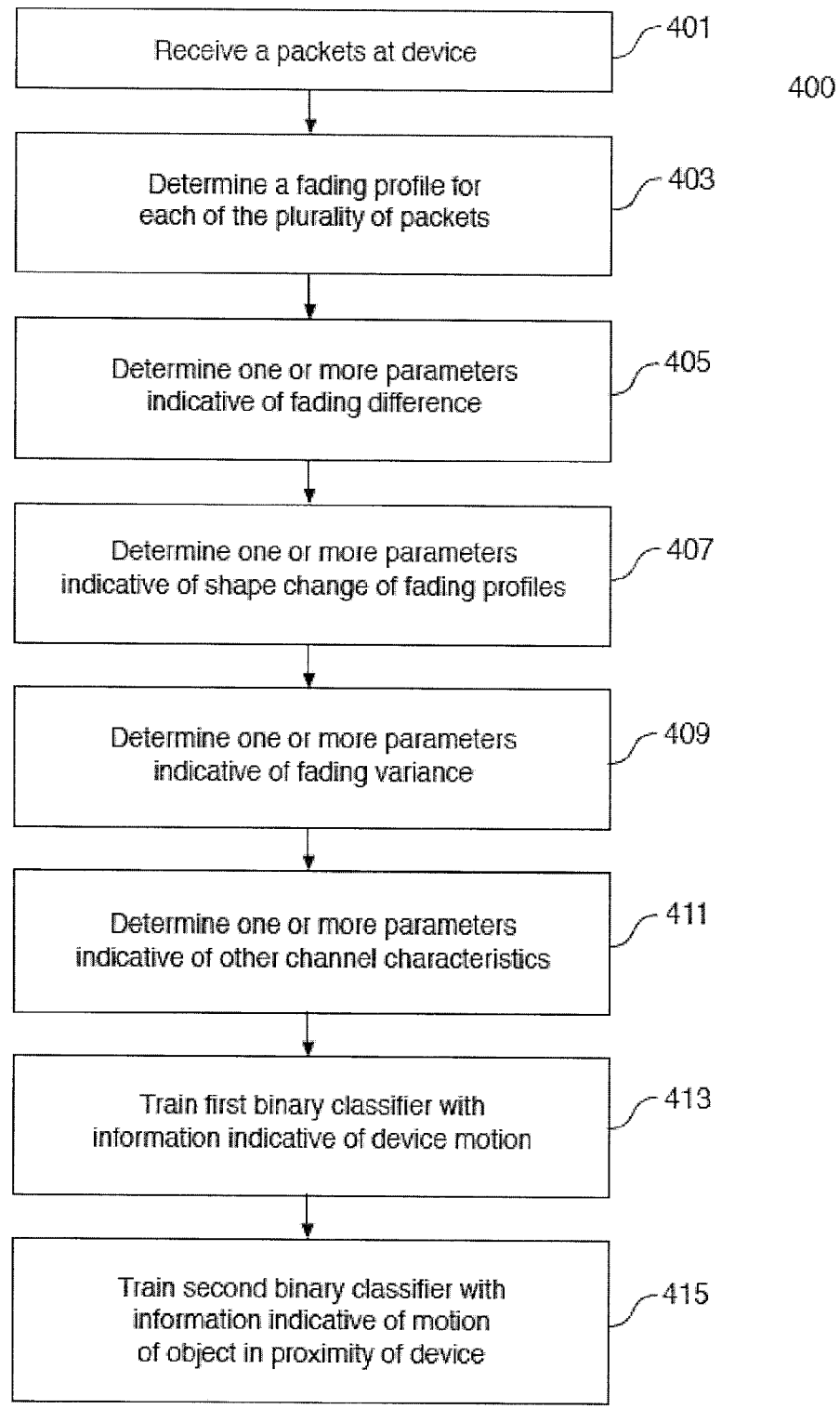
FIG. 4A illustrates a method for determining channel characteristics, in accordance with various aspects and principles of the present disclosure.

One aspect of the motion detection discussed above is illustrated in more detail in FIGS. 4A-4B. FIG. 4A illustrates a process 400 for determining channel characteristics (e.g., fading profile and fading changes) associated with a moving wireless-enabled device or with a moving object, in accordance with various aspects and principles of the present disclosure. The determined channel characteristics may be used to determine whether there is no motion, whether the wireless-enabled device is moving, or whether an object is moving in the vicinity of the wireless-enabled device. More particularly, FIG. 4A will illustrate using the determined channel characteristics to train a classifier function, which may be used to distinguish between the three situations discussed above. Training a classifier function may be part of a supervised learning technique in which a first set of channel characteristics may be determined by moving the wireless-enabled device and a second set of channel characteristics may be determined by keeping the wireless-enabled device stationary and having an object move in the vicinity of the wireless-enabled device.

Figure 4B:
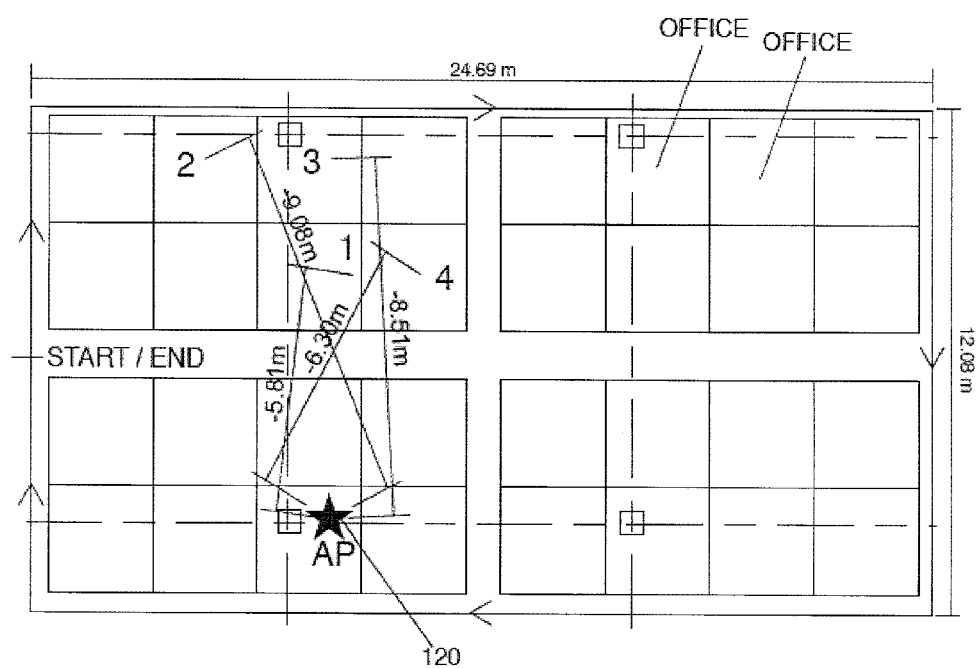
FIG. 4B illustrates an example environment for determining channel characteristics of signals from a transmitter, in accordance with various aspects and principles of the present disclosure.
Figure 4C:
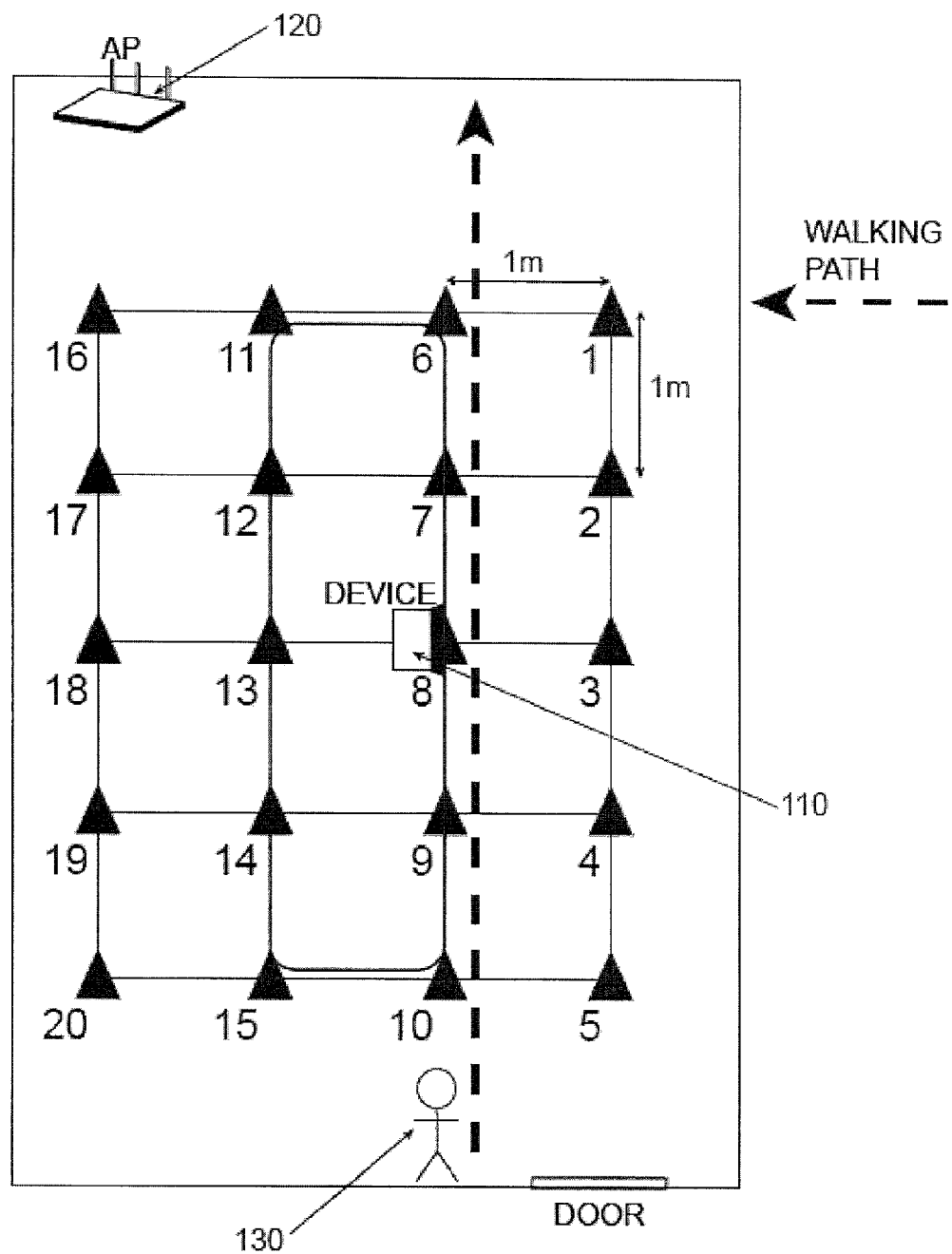
FIG. 4C illustrates an example environment for determining channel characteristics of signals from a transmitter, in accordance with various aspects and principles of the present disclosure.

FIG. 4B graphically illustrates training a classifier function by moving a wireless-enabled device. The device may be moved toward or away from a transmitter, such as transmitter 120, and may be moved to or away from various positions, such as positions 1-4 illustrated in FIG. 4B. The wireless-enabled device may receive a plurality of wireless signals during the movement, and may be trained to recognize device movement from channel dynamics of the plurality of wireless signals that were received during the device movement. FIG. 4C graphically illustrates training the classifier function by moving an object, such as person 130, relative to the wireless-enabled device, which is stationary. Person 130 may take a variety of paths that come near the wireless-enabled device. The wireless-enabled device may receive a plurality of wireless signals during the person's movement, and may be trained to recognize object movement from channel dynamics of the plurality of wireless signals that were received during the object movement.

In some cases, the classifier may be trained for a specific transmitter, a specific transmitter location, a specific indoor environment, or any combination thereof. In some cases, the classifier may be trained for general use with any transmitter, any class of transmitters, any transmitter location, any indoor environment, or any combination thereof. For example, while channel fading characteristics may differ based on transmitter location or layout of the indoor environment, how the channel fading characteristics change in response to motion may be similar among different transmitter locations or different indoor environments. The changes may be sufficiently similar such that a single classifier may be used for different transmitters, transmitter locations, or indoor environments. As discussed in more detail below, channel characteristics of different signals from different transmitters, transmitter locations, or indoor environments may all be normalized before being used by the single classifier. The classifier may be trained by an owner of the wireless-enabled device, a distributor or manufacturer of the wireless-enabled device, or any other party.

Returning to FIG. 4, at operation 401 of process 400, a packet or any other form of wireless signal may be received. The packet may be received from transmitter 120, transmitter 121, or any other transmitter. The packet may be received by receiver 111 of wireless-enabled device 110, or by any other wireless-enabled device. In some cases, the packet may be received after sampling a wireless medium or a data buffer. The sampling may be performed at a rate of, for example, 10 Hz, 50 Hz, 100 Hz, or 1 KHz. In one embodiment, a timestamp $t_i$ may be associated with the received packet.

Although operation 401 describes receiving one packet, additional packets from a transmitter may be received and used to determine channel characteristics. That is, the channel characteristics may account for fading dynamics among a plurality of packets that are received at various instances in time. Calculation of a channel characteristic and training of a classifier may be updated as additional packets are received. The calculation of channel characteristic and the training of the classifier may be based on tens, hundreds, thousands, or tens of thousands of packets.

After a packet is received, a channel characteristic such as a fading profile of the packet may be determined at operation 403. The fading profile, which may have characteristics resembling those illustrated in FIGS. 2A-2C, may indicate how signal strength of the packet fades across the channel on which the packet is modulated. The fading profile may be associated with timestamp $t_i$ and may be represented as $F_i = \{f_{i,k}\}_{k=1 \ldots N}$, where $f_{i,k}$ is a frequency response at subcarrier k at time instance i, and N represents the total number of subchannels scanned by a wireless-enabled device. For example, the fading profile may indicate a signal strength across 30 subchannels used in the IEEE 802.11 standard. In one embodiment, the fading profile may be determined by applying a discrete Fourier transform on the received packet. The fading profile may be determined by processor 113 or any other computing or control circuitry that may be external to wireless-enabled device 110.

After determining the fading profile, one or more parameter values for various categories of channel characteristics may be determined at operations 405-411. Determination of a parameter value may include initially calculating the parameter value or updating the parameter value. Like all other operations described herein, operations 405-411 may be performed in any order, or may be performed simultaneously.

At operation 405, one or more parameters that are indicative of fading difference may be determined, such as by processor 113 or any other computing or control circuit external to wireless-enabled device 110. The one or more parameters may capture a level of recent fading change among fading profiles of received packets.

In one embodiment, the one or more parameters determined at operation 405 may compare any number of fading profiles. Comparing the fading profiles may indicate how they change in response to different types of movement. How a fading profile may change in response to device motion may be different than how it changes in response to object motion. Various statistics may be used to compare fading profiles. When comparing two fading profiles, an average, maximum, minimum, median, or other statistic may be used to represent differences (e.g., differences across multiple subchannels) between the two fading profiles. When comparing more than two fading profiles, the fading profiles may be paired and compared two at a time, and multiple comparisons may be made for multiple pairs of fading profiles. A statistic may then be calculated for the multiple comparisons. As an example, one parameter may compare three fading profiles, such as those having the three most recent time stamps. The comparison may calculate a difference between a first fading profile and a second fading profile, and calculate a difference between the second fading profile and a third fading profile. For each subchannel of the fading profiles, the comparison may take a maximum of the two calculations. Finally, an average of the maxima across the subchannels may be outputted as the parameter value.

Concurrently or in sequence with determining the one or more fading difference parameters, one or more parameters that are indicative of the changes in shape of the fading profiles may be determined at operation 407. How the fading profiles change shape may be related to whether the wireless-enabled device is moving or whether an object in the vicinity of the wireless-enabled device is moving. In one embodiment, determining the one or more parameters may include computing a Pearson's correlation coefficient between two fading profiles. The Pearson's correlation between fading profiles X and Y may be calculated as $$\rho_{X,Y} = \frac{\text{Cov}(X, Y)}{\sigma_X \sigma_Y} = \frac{E[(X - \mu_X)(Y - \mu_Y)]}{\sigma_X \sigma_Y}.$$

Profiles X and Y may be any two fading profiles.

Concurrently or in sequence with determining the one or more parameters of changes in shape of fading profiles, one or more parameters indicative of fading variance may be determined at operation 409. The one or more fading variance parameters may capture a statistical distribution of fading profiles of, for example, recently received packets. In one embodiment, the fading variance may be determined by computing an average channel response at each subchannel of the fading profiles and then computing the average variance of each subchannel.

Concurrently or in sequence with determining the one or more fading variance parameters, one or more parameters indicative of other channel characteristics may be determined at operation 411. The other channel characteristics may include channel coherence bandwidth, power delay profile, or any other characteristics related to channel response.

Armed with the fading profiles and parameters respectively generated by operations 403-411, process 400 may train a classifier function to distinguish between no movement, movement of the wireless-enabled device, and movement of an object in the vicinity of a stationary wireless-enabled device. The classifier function may cascade a first binary classifier function and a second binary classifier function. The first binary classifier function may determine whether the wireless-enabled device is moving, while the second binary classifier function may determine whether the object is moving.

The first binary classifier may be trained at operation 413 to distinguish between whether the wireless-enabled device is moving or whether the wireless-enabled device is stationary. In one embodiment, the first binary classifier function may comprise a linear combination of one or more parameters determined at operations 405-411. In some instances, the first binary classifier function may be based on fewer than ten parameters. The first binary classifier function at operation 413 may be trained with one set of parameter values in which the wireless-enabled device was known to be moving and with one set of parameter values in which the wireless-enabled device was known to be stationary. In more specific instances, all objects in a vicinity of the wireless-enabled device may also be known to be stationary for both the former and latter set of parameter values.

In sequence or concurrently with training the first binary classifier function, the second binary classifier function may be trained at operation 415 to distinguish between whether an object in the vicinity of the wireless-enabled device is moving or whether there is no moving object. In one embodiment, the second binary classifier function may comprise a linear combination of one or more parameters determined at operations 405-411. In some instances, the second binary classifier function may be based on fewer than ten parameters. The second binary classifier function may be trained with one set of parameter values in which the object was known to be moving near the device and with one set of parameter values in which the object was known to be stationary. In more specific instances, the wireless-enabled device may also be known to be stationary for both the former and latter set of parameter values.

As noted above, one or more operations of method 400 may be performed on, for example, wireless-enabled device 110, or may be performed on a separate device, such as a server. For example, packet or other information may be relayed from wireless-enabled device 110 to a server, which may perform more computationally intensive operations.

Figure 5A:
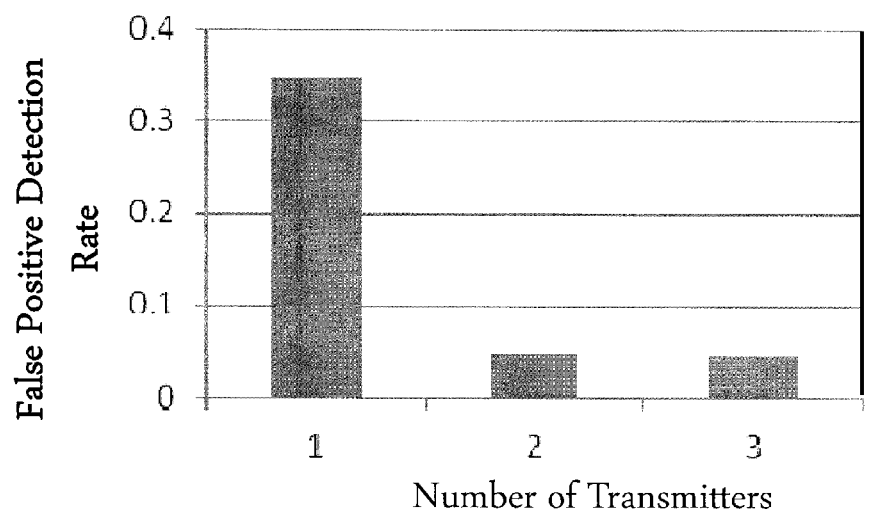
FIG. 5A illustrates example rates of false indication of object motion in a vicinity of a wireless-enabled device, in accordance with various aspects and principles of the present disclosure.

After the classifier function is trained by method 400, it may be used by a wireless-enabled device to determine whether there is device or object motion based on subsequently received wireless packets. In some instances, the wireless packets may be received from more than one transmitter. As discussed above, using a single transmitter may increase a probability that an object moving near the transmitter will be mistakenly identified as movement of the object near the wireless-enabled device. Channel dynamics of the transmitter's signals in the two situations may be similar. By using more than one transmitter, the probability of the mistaken identifications may be reduced. For instance, FIG. 5A illustrates example results in which using two or more transmitters reduced the false identification rate from 34% to 5%. In environments with many people, where there is a higher risk that two different people will pass near two different transmitters simultaneously, even more transmitters (e.g., three, four, etc.) may be used in the motion detection.

Figure 5B:
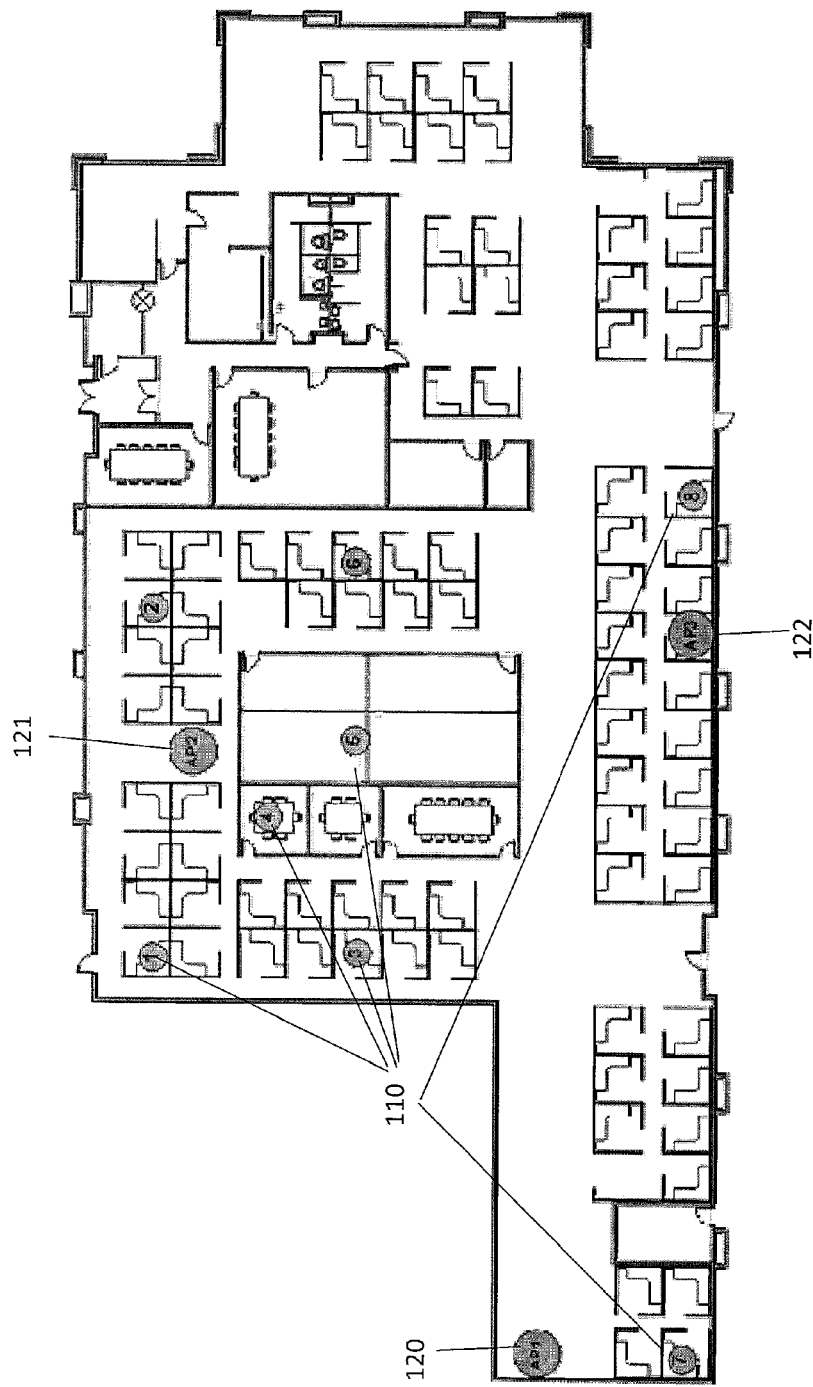
FIG. 5B illustrates an example environment having multiple transmitters for detecting motion based on channel characteristics, in accordance with various aspects and principles of the present disclosure.

FIG. 5B illustrates an indoor environment having a plurality of transmitters, including transmitters 120, 121, and 122. The transmitters may be placed, for example, several tens of meters apart. A collision-avoidance algorithm may be used to schedule transmissions among the plurality of transmitters. The wireless-enabled device 110 may be placed at a variety of locations in the environment. In the illustrated configuration, an object will not be able to be in a vicinity of more than one transmitter. Thus, when channel fading characteristics associated with one of the transmitters indicate object motion near a wireless-enabled device, that indication may be confirmed with channel fading characteristics associated with the other transmitters. If the object is near the wireless-enabled device, channel fading characteristics of signals from all three transmitters are likely to be consistent with object motion near the device. If the object is near transmitter 120 only, for example, channel fading characteristics of signals from transmitter 120 may be consistent with object motion near the device, but channel fading characteristics of signals from transmitters 121 and 122 likely will not be consistent with object motion near the device. Thus, comparison of channel fading characteristics of signals from at least two transmitters may resolve whether an object is near the wireless-enabled device or is near one of the transmitters.

Figure 6:
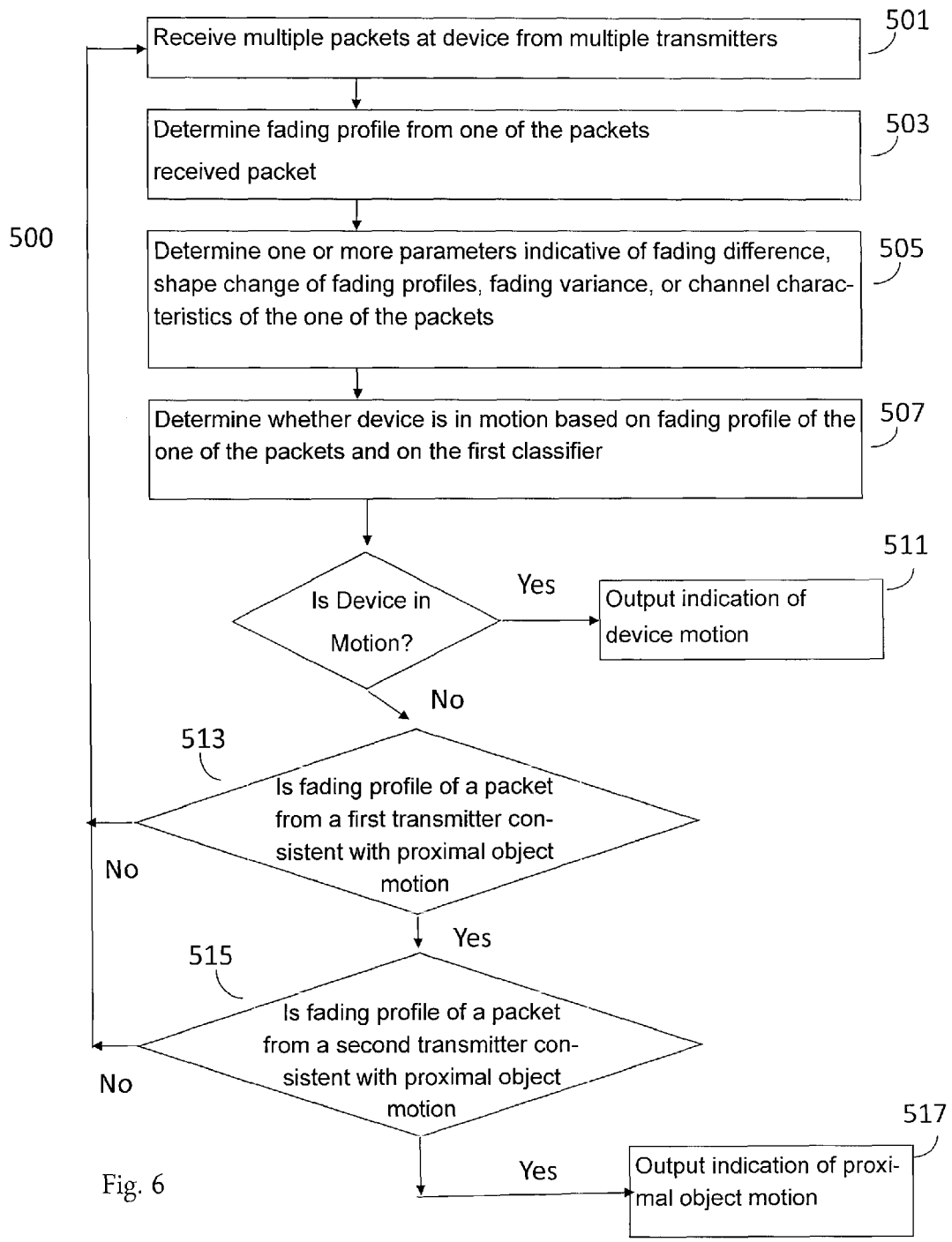
FIG. 6 illustrates a method for detecting motion based on channel characteristics, in accordance with various aspects and principles of the present disclosure.

A process for determining motion based on the trained classifier and the wireless signals from the multiple transmitters is illustrated in FIG. 6. At operation 501, a wireless packet or any other wireless signal from a transmitter may be received. The packet may be received by receiver 111 of wireless-enabled device 110, or by any other wireless-enabled device. Additional packets from the transmitter may be received and used to determine channel characteristics associated with the plurality of packets.

After a packet is received, a fading profile for the received packet may be determined at operation 503. The fading profile may indicate how signal strengths of the packet fade across a channel on which the packet is modulated. In one embodiment, the fading profile may be determined by applying a discrete Fourier transform on the received packet.

After the fading profile is determined, one or more parameters indicative of fading difference, of changes in shape of fading profiles, of fading variance, or of other channel characteristics may be determined at operation 505. Determination of the one or more parameters may be similar to the determination of the one or more parameters described at operations 405-411. Further, determination of the one or more parameters may be based on the most recently received packet as well as on previously received packets.

With one or more parameter values indicative of channel characteristics calculated, whether the wireless-enabled device is moving may be determined at operation 507. A classifier function may be used to determine whether the wireless-enabled device is moving based on the one or more parameter values. The classifier function may have a first portion and a second portion. The first portion may be a first binary classifier function that is trained to distinguish between device motion and no device motion at operation 507. The first binary classifier function may have been trained at operation 413.

If it is determined at operation 507 that the wireless-enabled device is in motion, an indication of device motion may be outputted at operation 511. The indication may be outputted to, for example, an application running on wireless-enabled device 110, or may be outputted to an external device such as a server.

If it is determined that the wireless-enabled device has not moved, whether there is motion of the object near the device may be determined at operations 513 and 515. The determination may be based on the one or more parameter values calculated from one or more fading profiles of one or more packets. As discussed above, the one or more packets may be from two, three, or more transmitters.

At operation 513, whether channel characteristics of wireless signals from a first transmitter (e.g., one of transmitter 120 or 121) are consistent with object motion in the vicinity of the wireless-enabled device may be determined. The determination may rely on a second portion of the overall classifier function, which may include a second binary classifier function trained to distinguish between object motion and a lack of object motion based on channel fading profiles and other channel characteristics. The binary classifier function may have been trained, for example, at operation 415. If it is determined at operation 513 that the channel characteristics associated with the first transmitter is consistent with object motion in the vicinity of the device, the determination may be confirmed at operation 515.

At operation 515, whether channel characteristics of wireless signals from a second transmitter (e.g., another one of transmitter 120 or 121) are consistent with object motion in the vicinity of the device may be determined. The determination may rely on the second portion of the overall classifier function. The wireless signals from the second transmitter may have been received prior to, concurrently with, or after wireless signals from the first transmitter were received. In some cases, the wireless signals from the second transmitter may be received only in response to determining that channel characteristics associated with the first transmitter are consistent with object motion near the wireless-enabled device.

If operations 513 and 515 determine that channel characteristics of signals from at least two transmitters are each consistent with object motion in the vicinity of the wireless-enabled device, an indication of the object's movement in the vicinity of the device may be outputted at operation 517. Although FIG. 6 shows operations 513 and 515 performed before operation 507, operations of process 500 may be performed in any order. Some operations may be performed simultaneously.

Figure 7A:
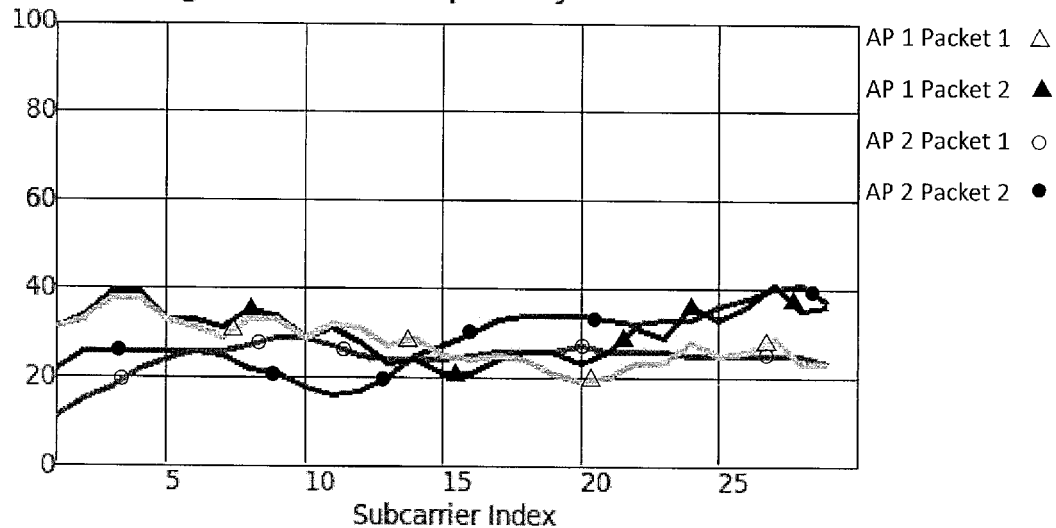
FIG. 7A illustrates example fading profiles of signals from multiple transmitters, in accordance with various aspects and principles of the present disclosure.
Figure 7B:
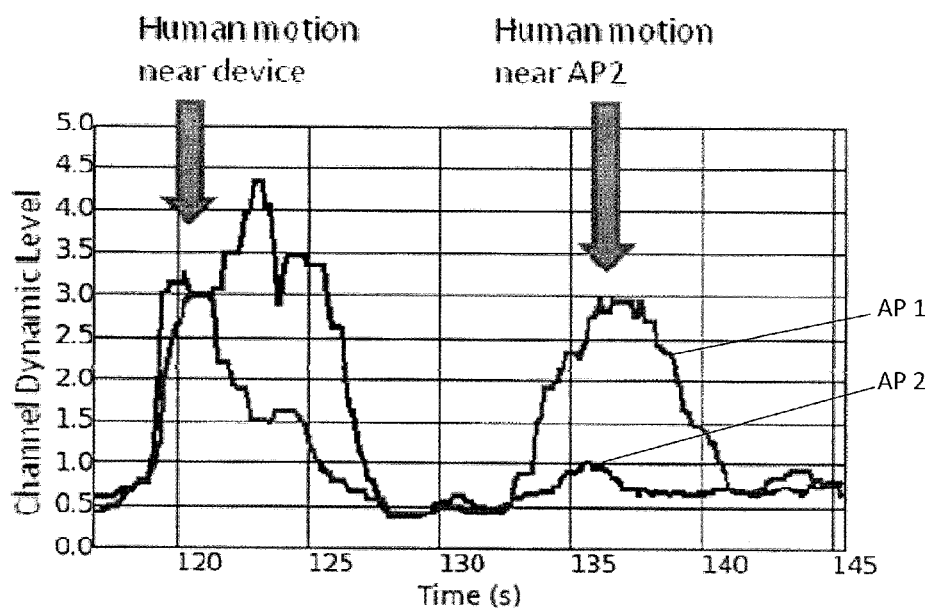
FIG. 7B illustrates example channel fading dynamics corresponding to multiple transmitters, in accordance with various aspects and principles of the present disclosure.

A graphical illustration of using a classifier function to detect motion is presented in FIGS. 7A and 7B. FIG. 7A illustrates channel fading profiles associated with wireless packets from two transmitters. The figure illustrates only two transmitters that each transmit only two packets, but other embodiments may rely on more (e.g., three, four, etc.) transmitters that each transmit more packets to the wireless-enabled device. In one example, channel fading profile associated with a transmitter may be calculated based on 30 packets from the transmitter. A collision-avoidance algorithm may ensure that packets from the multiple transmitters arrive sequentially and do not interfere with each other.

FIG. 7B illustrates channel dynamics values of packets from a first of the two transmitters and channel dynamics values of packets from a second of the two transmitters. The channel dynamics values may measure, for example, change in channel fading profiles. They may have been calculated at, for example, operation 505. The classifier function may use a threshold (e.g., 2.5) to distinguish between channel dynamics values that are consistent with motion in a vicinity of the wireless-enabled device and channel dynamics values that are consistent with no motion. FIG. 7B illustrates an instance, around the 120-second mark, when channel dynamics associated with at least two transmitters are both consistent with object motion in a vicinity of the wireless-enabled device. An object may be determined to have moved near the device around that time. FIG. 7B further illustrates another instance, around the 137-second mark, when channel dynamics associated with only one transmitter are consistent with object motion in the vicinity of the wireless-enabled device. The consistency may be determined as a false positive detection caused by an object moving near the one transmitter. Accordingly, FIGS. 7A-7B graphically illustrate distinguishing between object motion near a wireless-enabled device and object motion near a transmitter.

Figure 8A:
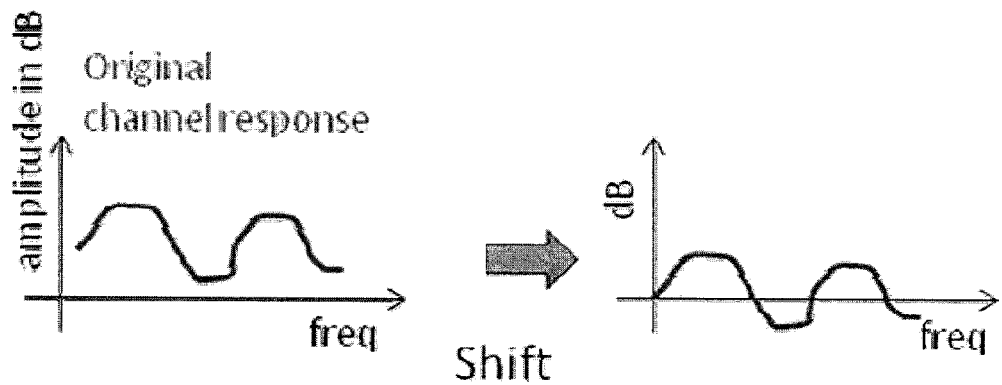
FIGS. 8A-8B illustrates an example normalization of a fading profile, in accordance with various aspects and principles of the present disclosure.
Figure 8B:
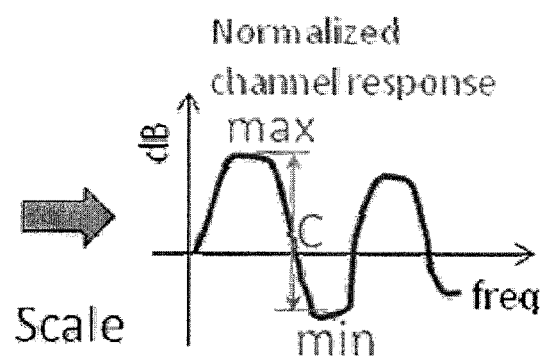

FIGS. 8A-8B illustrate normalizing channel characteristics of signals before parameter values are calculated from them or before they are used by classifier functions to determine motion. Without normalization, differences among transmitters and their placements may need to be accounted for. Signals from different transmitters at different locations may experience different propagation distances, different multipath conditions, different transmitter sensitivities to multipath interference, or other different channel conditions. In such instances, a classifier function may need to use, for example, different thresholds for detecting object motion, with each threshold corresponding to a different transmitter. To avoid having to train, for each transmitter, a transmitter-specific classifier function, characteristics of wireless signals from the different transmitters may be normalized. The normalized characteristics from the different signals may then yield parameter values that can be used by a single classifier function to determine motion of nearby objects or of the device.

In some embodiments, the normalization may comprise a shift operation and a scale operation. The shift operation may divide a channel fading profile or other channel characteristics of each wireless signal by an average strength (e.g., average RSSI) of the channel characteristics. The shift may account for differences in values of channel dynamics among wireless signals with different signal strengths. For example, signals with stronger signal strengths, such as ones traveling a shorter distance to the wireless-enabled device, may lead to higher calculated values of channel fading profiles than signals with weaker values. To provide a common reference to interpret the channel fading profiles of signals, the channel fading profiles may all be normalized by dividing each fading profile by its own average signal strength. Each shifted fading profile may thus have an average value of 0 dB. FIG. 8A illustrates the shift of a fading profile by an average RSSI in decibels (division by average RSSI value (e.g., in volts) equals subtraction by logarithm of average RSSI (e.g., in decibels)). In some instances, the shift operation may also remove additional fading variations caused by an inaccurate auto-gain control.

The scale operation may address the impact of different multipath conditions experienced by signals from different transmitters. Signals from some transmitters may encounter weaker multipath effects and thus exhibit channel characteristics that are less sensitive to motion. Such channel characteristics, such as a channel profile, may be flatter than other channel profiles associated with other signals encountering stronger multipath effects. These channel profiles may yield different values of channel dynamics, even if the values in all cases are associated with movement of an object near the device or with the device. To account for the different multipath effects, the channel fading profile or other channel characteristics of each signal may be scaled such that the difference between a maximum of the profile and a minimum of all normalized profiles is a constant value C. FIG. 8B illustrates the scaling operation. In one example, C may be 10 dB. In the example, the scaling operation may include multiplying the fading profile by a certain factor in decibels or raising each value of the fading profile to a certain power (scaling a logarithm of X by a factor of k equals the logarithm of $X^k$).

After channel characteristics among different transmitters are normalized, parameters indicative of fading difference, shape change of fading profiles, fading variance or other parameters may be calculated from the normalized fading profiles.

Having thus described the novel concepts of the motion detection apparatus, method, and system, it will be apparent to those skilled in the art after reading this detailed disclosure that the foregoing detailed disclosure is intended to be presented by way of example only and is not limiting. Various alterations, improvements, and modifications will occur and are intended to those skilled in the art, though not expressly stated herein. The alterations, improvements, and modifications are intended to be suggested by this disclosure, and are within the spirit and scope of the exemplary aspects of this disclosure. Additionally, the recited order of processing elements or sequences, or the use of numbers, letters, or other designations therefore, is not intended to limit the claimed processes and methods to any order except as can be specified in the claims. Although the above disclosure discusses through various examples what is currently considered to be a variety of useful aspects of the disclosure, it is to be understood that such detail is solely for that purpose, and that the appended claims are not limited to the disclosed aspects, but, on the contrary, are intended to cover modifications and equivalent arrangements that are within the spirit and scope of the disclosed aspects.

What is claimed is:

1. A method for detecting motion with a device, comprising:

receiving, at the device, a first set of wireless signals from a first transmitter;

receiving, at the device, a second set of wireless signals from a second transmitter;

determining, at the device, a first value indicative of fading attenuations experienced by the first set of wireless signals;

determining, at the device, a second value indicative of fading attenuations experienced by the second set of wireless signals;

determining whether the first value is consistent with motion of an object in proximity to the device;

determining whether the second value is consistent with motion of the object in proximity to the device; and outputting an indication of presence of the object if the first value and the second value are consistent with motion of the object in proximity to the device.

2. The method of claim 1, wherein the determining the first value comprises:

determining, for each wireless signal of the first set of wireless signals, a fading profile indicative of how the wireless signal experiences fading attenuation at the device; and determining the first value based on one or more differences among the determined fading profiles of the first set of wireless signals.

3. The method of claim 2, further comprising normalizing, for each wireless signal of the first set of wireless signals, the fading profile of the wireless signal of the first set of wireless signals.

4. The method of claim 3, wherein the fading profile has a unit of decibels, and wherein the normalizing the fading profile of the wireless signal comprises subtracting the fading profile, in decibels, by an average value, in decibels, of the fading profile.

5. The method of claim 4, wherein the fading profile of the wireless signal has a range between a maximum decibel value and a minimum decibel value, and wherein the normalizing the fading profile further comprises scaling the fading profile, in decibels, by a quotient substantially equal to a normalization constant divided by the range.

6. The method of claim 5, wherein the fading profile is a first fading profile, the method further comprising normalizing, for each wireless signal of the second set of wireless signals, a second fading profile of the wireless signal of the second set of wireless signals, wherein the second fading profile has a unit of decibels, and wherein the normalizing the second fading profile comprises subtracting the second fading profile, in decibels, by an average value, in decibels, of the second fading profile and comprises scaling the second fading profile, in decibels, by a quotient substantially equal to the normalization constant divided by a range of the second fading profile.

7. The method of claim 2, wherein the determining the first value based on the one or more differences among the determined fading profiles of the first set of wireless signals comprises determining a difference in shape between at least two of the determined fading profiles of the first set of wireless signals.

8. The method of claim 2, further comprising:

receiving, at the device, one or more additional sets of wireless signals from one or more additional transmitters;

determining, at the device, one or more additional values indicative of fading attenuations experienced by the one or more additional sets of wireless signals; and determining whether each of the one or more additional values are consistent with motion of the object in proximity to the device.

9. A device, comprising:

a receiver configured to receive a first set of wireless signals and a second set of wireless signals;

a processing unit configured to:
determine a first value indicative of fading attenuations experienced by the first set of wireless signals;
determine a second value indicative of fading attenuations experienced by the second set of wireless signals;
determine whether the first value is consistent with motion of an object in proximity to the device;
determine whether the second value is consistent with motion of the object in proximity to the device; and
cause the device to output an indication of presence of the object if the first value and the second value are consistent with motion of the object in proximity to the device.

10. The device of claim 9, wherein the processing unit is configured to determine the first value by:

determining, for each wireless signal of the first set of wireless signals, a fading profile indicative of how the wireless signal experiences fading attenuation at the device; and determining the first value based on one or more differences among the determined fading profiles of the first set of wireless signals.

11. The device of claim 10, wherein the processing unit is configured to normalize, for each wireless signal of the first set of wireless signals, the fading profile of the wireless signal of the first set of wireless signals.

12. The device of claim 11, wherein the fading profile has a unit of decibels, and wherein the processing unit is configured to normalize the fading profile of the wireless signal by subtracting the fading profile, in decibels, by an average value, in decibels, of the fading profile.

13. The device of claim 12, wherein the fading profile has a range between a maximum decibel value and a minimum decibel value, and wherein the processing unit is configured to normalize the fading profile by scaling the fading profile, in decibels, by a quotient substantially equal to a normalization constant divided by the range.

14. The device of claim 13, wherein the fading profile is a first fading profile, the processing unit further configured to normalize, for each wireless signal of the second set of wireless signals, a second fading profile of the wireless signal of the second set of wireless signals, wherein the second fading profile has a unit of decibels, and wherein the processing unit is configured to normalize the second fading profile by subtracting the second fading profile, in decibels, by an average value, in decibels, of the second fading profile and by scaling the second fading profile, in decibels, by a quotient substantially equal to the normalization constant divided by a range of the second fading profile.

15. The device of claim 10, wherein the processing unit is configured to determine the first value based on the one or more differences among the determined fading profiles of the first set of wireless signals by:

determining a difference in shape between at least two of the determined fading profiles of the first set of wireless signals.

16. The device of claim 10, wherein the processing unit is configured to:

receive one or more additional sets of wireless signals from one or more additional transmitters;

determine one or more additional values indicative of fading attenuations experienced by the one or more additional sets of wireless signals; and determine whether each of the one or more additional values are consistent with motion of the object in proximity to the device.

17. A system for detecting motion in proximity to a device, comprising: a first transmitter configured to transmit a first set of wireless signals; a second transmitter configured to transmit a second set of wireless signals; a device having a receiver and a processing unit, wherein the receiver is configured to receive the first set of wireless signals and the second set of wireless signals, and the processing unit is configured to: determine a first value indicative of fading attenuations experienced by the first set of wireless signals; determine a second value indicative of fading attenuations experienced by the second set of wireless signals; determine whether the first value is consistent with motion of an object in proximity to the device; determine whether the second value is consistent with motion of the object in proximity to the device and cause the device to output an indication of presence of the object if the first value and the second value are consistent with motion of the object in proximity to the device.

18. The system of claim 17, wherein the processing unit is configured to determine the first value by:
   determining, for each wireless signal of the first set of wireless signals, a fading profile indicative of how the wireless signal experiences fading attenuation at the device; and
   determining the first value based on one or more differences among the determined fading profiles of the first set of wireless signals.

19. The system of claim 18, wherein the processing unit is configured to normalize, for each wireless signal of the first set of wireless signals, the fading profile of the wireless signal of the first set of wireless signals.

20. The system of claim 19, wherein the fading profile has a unit of decibels, and wherein the processing unit is configured to normalize the fading profile of the wireless signal by subtracting the fading profile, in decibels, by an average value, in decibels, of the fading profile.

21. The system of claim 20, wherein the fading profile has a range between a maximum decibel value and a minimum decibel value, and wherein the processing unit is configured to normalize the fading profile by scaling the fading profile, in decibels, by a quotient substantially equal to a normalization constant divided by the range.

22. The system of claim 21, wherein the fading profile is a first fading profile, the processing unit further configured to normalize, for each wireless signal of the second set of wireless signals, a second fading profile of the wireless signal of the second set of wireless signals, wherein the second fading profile has a unit of decibels, and wherein the processing unit is configured to normalize the second fading profile by subtracting the second fading profile, in decibels, by an average value, in decibels, of the second fading profile and by scaling the second fading profile, in decibels, by a quotient substantially equal to the normalization constant divided by a range of the second fading profile.

23. The system of claim 18, wherein the processing unit is configured to determine the first value based on the one or more differences among the determined fading profiles of the first set of wireless signals by:
   determining a difference in shape between at least two of the determined fading profiles of the first set of wireless signals.

24. The system of claim 18, wherein the processing unit is configured to:
   receive one or more additional sets of wireless signals from one or more additional transmitters;
   determine one or more additional values indicative of fading attenuations experienced by the one or more additional sets of wireless signals; and
   determine whether each of the one or more additional values are consistent with motion of the object in proximity to the device.

* * * * *